United States Patent [19]
Gorim et al.

[11] 3,937,788
[45] Feb. 10, 1976

[54] TREATMENT OF GASES CONTAINING SULFUR DIOXIDE

[75] Inventors: Everett Gorim; Metro D. Kulik; Robert T. Struck, all of Pittsburgh, Pa.

[73] Assignee: Continental Oil Company, Ponca City, Okla.

[22] Filed: Oct. 29, 1973

[21] Appl. No.: 410,722

Related U.S. Application Data

[63] Continuation of Ser. No. 222,760, Feb. 2, 1972, abandoned.

[52] U.S. Cl. .............................................. 423/242
[51] Int. Cl.² ........................................ C01B 17/00
[58] Field of Search ........................... 423/242–244

[56] References Cited
UNITED STATES PATENTS

| | | | |
|---|---|---|---|
| 1,795,121 | 3/1931 | Hansen | 423/222 |
| 2,729,543 | 1/1956 | Keller | 423/242 |
| 3,431,070 | 3/1969 | Keller | 423/242 |
| 3,523,755 | 8/1970 | McRae | 423/539 |
| 3,574,097 | 4/1971 | Urban | 423/242 X |
| 3,644,087 | 2/1972 | Urban | 423/242 |

Primary Examiner—Oscar R. Vertiz
Assistant Examiner—Gregory A. Heller
Attorney, Agent, or Firm—William A. Mikesell, Jr.; D. Leigh Fowler, Jr.; Stanley J. Price, Jr.

[57] ABSTRACT

An improvement in wet regenerative $SO_2$ scrubbing systems using a sulfite-forming additive wherein a thiosulfate-rich aqueous solution is used to prevent oxidation of sulfite to sulfate, to serve as a source of the sulfite-forming additive, and also to increase the salt concentration of the $SO_2$ absorbent, to thereby permit operation of the scrubbing system at higher temperature.

5 Claims, 1 Drawing Figure

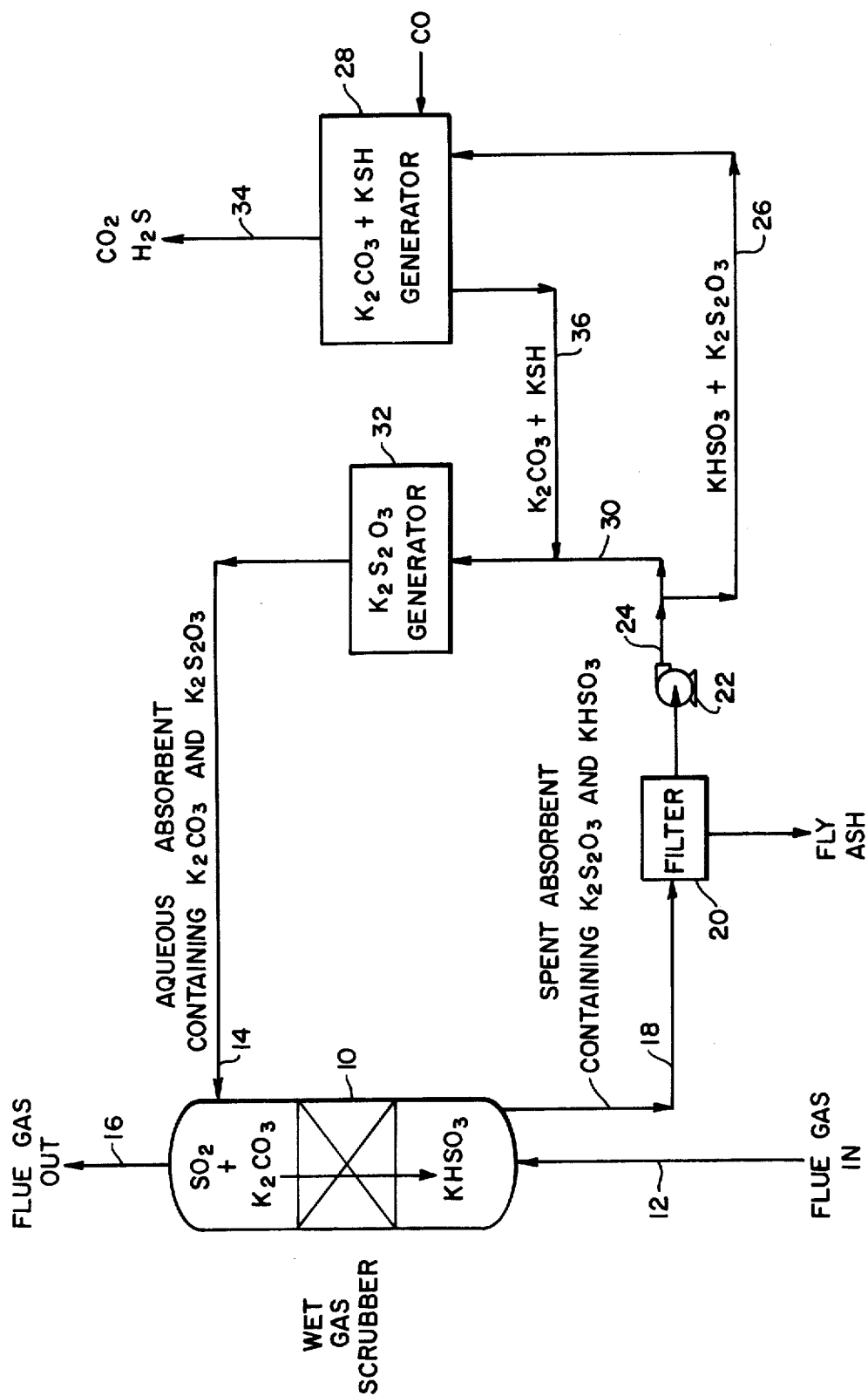

TREATMENT OF GASES CONTAINING SULFUR DIOXIDE

CROSS-REFERENCES TO RELATED APPLICATIONS

This application is a continuation of application, Ser. No. 222,760, filed Feb. 2, 1972 and now abandoned. Other related applications, describing and claiming certain subject matter hereinafter disclosed are (1) an application, Ser. No. 309,869, filed Nov. 27, 1972, entitled "Improvement in the Removal of Sulfur Dioxide from Gases Containing Sulfur Dioxide and Oxygen" and now abandoned; (2) an application, Ser. No. 347,261, filed Apr. 2, 1973, entitled "A Regenerative Process for Removal of Suflur Dioxide" and now abandoned; and (3) an application, Ser. No. 358,786, filed May 9, 1973, entitled "Treatment of Gases Containing Sulfur Dioxide". All of the aforementioned applications were filed by Everett Gorin, Metro D. Kulik and Robert T. Struck, and have been assigned to Consolidation Coal Company.

BACKGROUND OF THE INVENTION

1. Field of the Invention

The present invention relates to the treatment of gases containing sulfur dioxide, and more particularly, to an improvement in those processes for removal of sulfur dioxide which use an aqueous absorbent containing a sulfite-forming additive in approximately the amount required to convert the sulfur dioxide to sulfite. The term "sulfite" as used herein refers to both the sulfite and bisulfite form of the anion.

2. Description of the Prior Art

The art is extensive on sulfur dioxide removal from flue gases by means of aqueous absorbents containing sulfite-forming additives. The sulfite-forming additives that are generally considered for the removal of sulfur dioxide are such materials as the oxides, hydroxides and carbonates of alkali and alkaline earth metals, as well as ammonia and its derivatives. The absorption of sulfur dioxide ($SO_2$) by suitable contact of an $SO_2$-containing gas phase with an aqueous solution or slurry containing such additives is both rapid and efficient, provided certain conditions are satisfied. Efficient absorption depends upon operating with scrubbing solutions which contain a low equilibrium vapor pressure of $SO_2$ over them. Such a condition is reached when the concentration of sulfite is relatively low, i.e. less than about five weight percent, and when the pH is relatively high, i.e. greater than about 5.5–6.0.

Rapid absorption can be achieved, in general, by operating with scrubbers of proper design which provide adquate contact area between the liquid and the gas and in which turbulent flow conditions are maintained.

The state of the art of sulfur dioxide removal from industrial waste gases as of the year 1958 is presented by the Bureau of Mines (U.S. Department of the Interior) in its Information Circular 7836 entitled "Sulfur Dioxide - Its Chemistry and Removal from Industrial Waste Gases" by D. Bienstock, L. W. Brunn, E. M. Murphy and H. E. Benson.

The difficulties associated with the use of the above-cited absorbents include the following. Firstly, the perhaps most serious, is the formation of sulfates by oxidation of the sulfites formed in the scrubber. Presumably, such sulfates result from reaction of the oxygen contained in the flue gas with the sulfites, either sulfite or bisulfite. In any case, the sulfate content of the absorbent builds up in any regenerative system, that is one where the additive is regenerated for reuse in the scrubber. To prevent such build-up, a portion of the absorbent must be discarded, thus causing a waste of useful absorbent. Secondly, the regeneration of the additive has always been a problem in terms of cost. Any regeneration procedure which is effective but cheaper than those now known will be an improvement. Thirdly and lastly, the concentration of the additive in aqueous absorbents of the foregoing type is very small since the low $SO_2$ content of the gas requires a correspondingly small amount of additive. Yet adequate contact between gas and additive requires a relatively large volume of aqueous absorbent. Such dilute aqueous solutions impose an undesirably low temperature of operation in the scrubber. Higher concentrations of salts in the aqueous absorbent would permit higher temperature scrubbing, and hence less reheat is required before the scrubbed gas is released to the atmosphere.

The primary object of the present invention is to provide an improvement in the processes of the type described which alleviates these problems. Patents which may be considered pertinent to out improvement, although not, in our opinion, suggestive thereof are: U.S. Pat. Nos. 1,795,121 and 3,523,755, and British Patents Nos. 134,943 and 459,418.

SUMMARY OF THE INVENTION

In accordance with the present invention, an improvement is provided in those processes for removing $SO_2$ from flue gases which use an aqueous absorbent containing a sulfite-forming additive. The improvement is the use of a thiosulfate-rich aqueous solution as the vehicle or carrier for the sulfite-forming additive. The particular thiosulfate used is one having the same cation as that of the sulfite-forming additive. Thus, when the sulfite-forming additive is an alkali metal, alkaline earth metal, or ammonium hydroxide, or carbonate, the thiosulfate would be, respectively, an alkali metal, an alkaline earth metal, or an ammonium thiosulfate.

The concentration of the thiosulfate in the aqueous absorbent is preferably as high as its solubility will permit. Desirably, the total salt content of the aqueous absorbent is of the order of 50 percent by weight or greater. The concentration of the sulfite-forming additive is generally less than two percent by weight in the circulating solution entering the scrubber.

It is apparent, therefore, that the thiosulfate is the principal component as between the two. In some instances, other solutes may be added to serve special purposes, an example of which will be mentioned later. The minimum concentration of the thiosulfate is 50 weight percent of the total sulfur-containing solutes in the absorbent as it leaves the scrubber, and preferably, is at least 25 percent by weight of the absorbent.

The maximum concentration of thiosulfate that is suitable is set by its solubility limit at the operating conditions. This can be as high as 75 weight percent of the total sorbent for the more soluble salts such as potassium thiosulfate. It is possible to operate above the solubility limit of the thiosulfate wherein the insoluble portion is transported through the scrubber as a slurry. Generally, however, this mode of operation is not advantageous.

The sulfite-forming additive itself may be sparingly soluble. This is particularly true of the alkaline earth hydroxides and carbonates and, to a lesser extent, is true for sodium carbonate and bicarbonate. These materials may be fed to the scrubber system as slurries rather than as true solutions. They are converted to the soluble thiosulfate form within the scrubber system.

It is also desirable to operate, as was pointed out above, with low sulfite plus bisulfite concentrations in the circulating sorbent and, preferably, below 5 weight percent. This is desirable, both in order to achieve efficient $SO_2$ absorption, and to minimize oxidation to sulfate.

The thiosulfate serves three purposes: (1) Its presence in large amount greatly reduces the amount of sulfate formed by the reaction of sulfites and oxygen in the flue gas. Yet, it, itself, is substantially inert to oxygen and $SO_2$ when the pH is maintained between 6 and 8. (2) The thiosulfate serves as a source of the sulfite-forming additive. A small slip stream of the effluent product from the scrubber is withdrawn from the main recirculatory stream and subjected to reduction by a reducing agent to regenerate the sulfite-forming additive. At the same time, in the main recirculatory stream, the major portion of the sulfites formed in the scrubber are reacted rapidly and quantitatively with a reducing agent (for example, elemental sulfur, $H_2S$, HCOOH, and MHS) to convert the sulfites to the corresponding thiosulfate, provided the pH is maintained between 6 and 7.8. Thus, the sulfites are themselves used to replenish the thiosulfate, thus assuring a very low concentration of sulfites in the absorbent. A completely self-sufficient system is thus provided. (3) The third purpose served by the thiosulfate is to provide an essentially inert solid solute in the absorbent that permits high salt concentration whereby higher temperatures of operation may be achieved in the scrubber.

PREFERRED EMBODIMENT

The flowsheet submitted herewith represents a preferred embodiment of the improved process of this invention. The sulfite-forming additive which we prefer to use is potassium carbonate, $K_2CO_3$, because of the high solubility of potassium thiosulfate, $K_2S_2O_3$, in water.

Referring to the drawing, a gas stream containing $SO_2$, e.g. a flue gas, is introduced into the bottom of the absorber or scrubber tower 10 through an inlet gas line 12. The scrubber 10 may be, for example, a conventional countercurrent packed tower, spray tower, or other conventional scrubbing apparatus. Aqueous absorbent containing the sulfite-forming additive and the thiosulfate is continuously fed through a conduit 14 into the top of the tower 10. The composition of the absorbent fed through conduit 14 during normal operation of the recirculatory system is as follows: $K_2S_2O_3$ - 55 percent by weight; $K_2CO_3$ - 0.2 to 0.3 percent by weight; and sulfites expressed as $KHSO_2$ - approximately 2 percent by weight, with the balance water. The flue gas is preferably passed upwardly in countercurrent flow to the aqueous absorbent which enters the top of the tower. The temperature within the tower is preferably maintained, by any suitable means, between 125° and 160°F. The principal reactions occurring in the scrubber are the following:

(1 a) $K_2CO_3 + SO_2 = K_2SO_3 + CO_2$
(1b) $K_2SO_3 + SO_2 + H_2O = 2 KHSO_3$

The pH is maintained below 7.5, and preferably between about 6 and 7 in a manner described later in the liquid stream leaving the tower through line 18. The liquid entering the tower through line 14 generally will be from 0.2 or 0.8 units higher in pH depending on the liquid circulation rate. In no case must the pH in line 14 exceed a value of about 8.

The range of liquid circulation rates through line 18 is suitably between 5 and 15 gallon/1000 CF of gas entering the tower through line 12. No reaction between the $SO_2$ and the thiosulfate was ever observed under these conditions, nor for that matter, between the oxygen of the flue gas and the thiosulfate.

The effluent stream leaving the bottom of the scrubber contains essentially no $K_2CO_3$, but only $K_2S_2O_3$ and sulfites. The sulfite is, in reality, a mixture of $K_2SO_3$ and $KHSO_3$. The proportions of the sulfite to bisulfite increases with pH. At a pH of 7.0, the molar ratio of bisulfite to sulfite is approximately one. The $K_2S_2O_3$ concentration remains essentially unchanged from that of the feed absorbent, namely 55 weight percent. The $K_2CO_3$ concentration has dropped substantially to zero, while the sulfite concentration expressed as weight percent equivalent $KHSO_2$ has increases to 2.0 weight percent. There is a small amount of sulfate in the effluent absorbent, e.g. about one percent or less of the sulfur absorbed, a significant improvement over the 5 to 10 percent generally found in such systems.

The efficiency of absorption of $SO_2$ and compositions of the scrubbing product is dictated by the feed rate and composition of the regenerated solution entering the scrubber system through conduit 36. The solution normally contains KSH which reacts rapidly in the thiosulfate generator 32 with the bisulfite in the recirculated scrubber solution which enters through conduit 30 via the reaction:

(2) $2 KHSO_3 + KSH = 3/2 K_2S_2O_3 + 3/2 H_2O$

This reaction occurs rapidly at the same or slightly higher temperature as used in the scrubbing tower, i.e. at 125°–170°F. A sufficient residence time must be provided in the thiosulfate generator 32 to provide for complete consumption of the KSH feed. This is essential to avoid evolution of $H_2S$ into the treated stack gas. It is essential, for the same reason, that a small excess of $KHSO_3$ be present. The reaction rate decreases with decreasing pH and, for this reason, the operating pH should be maintained below 8 in the thiosulfate generator 32. A residence time of 0.5–5 minutes is usually sufficient to provide for complete consumption of KSH in the thiosulfate generator 32 provided the pH is in the preferred range of 6.7–7.8 and the total sulfite concentration present in the effluent liquid expressed as $KHSO_3$ is at least one weight percent.

The net overall reaction in the scrubber system may be expressed by the equation (3) $K_2CO_3 + KSH + 2 SO_2 = 3/2 K_2S_2O_3 + 1/2 H_2O + CO_2$ Thus, efficient absorption of $SO_2$ is obtained if the feedrate of $K_2CO_3$ through line 36 is approximately ½ mol/mol $SO_2$ fed through line 12. However, the feedrate of $K_2CO_3$ must not substantially exceed the above value since, if it does, the pH in the entering solution in line 14 will exceed the maximum prescribed value of 8.

Similarly, the mol ratio of KSH to $K_2CO_3$ in the feed solution should not exceed the maximum value of 1.0 as indicated by equation (3) and should be below this value to provide for the presence of $KHSO_3$ in the effluent from the $K_2S_2O_3$ generator 32. On the other hand, the molar ratio of KSH to $K_2CO_3$ must not be too low, for in this case, the sulfite concentration will build up to an unacceptably high value with resultant formation of undesirable sulfate. Suitably, the molar ratio of KSH to $K_2CO_3$ should be in the range of about 0.75 to 0.98 in the feed solution entering through conduit 36.

The solution entering through conduit 36 will more generally contain the salts $KHCO_3$ and small amounts of $K_2S$ in addition to $K_2CO_3$ and KSH. These materials react similarly and the feed relationships may be more broadly defined as follows:

Efficient absorption of $SO_2$ requires that, in the feed, the ratio $$\frac{2 \times \text{Mols } K_2CO_3 + \text{Mols } KHCO_3}{\text{Mols } SO_2}$$

should be close to, but not substantially exceed, one. Similarly, adequate conversion of the absorbed $SO_2$ to $K_2S_2O_3$ without evolution of $H_2S$ into the treated gas requires that the feed ratio $$\frac{\text{Mols KSH} + \text{Mols } K_2S}{\text{Mols } K_2CO_3 + \frac{1}{2} \times (\text{Mols } KHCO_3 + \text{Mols } K_2S)}$$

be suitably maintained in the range of 0.75 to 0.98.

The effluent or spent absorbent is withdrawn from the scrubber through a conduit 18 to a filter 20 where any fly ash is removed. If the absorbent is a slurry rather than a solution only, then any fly ash obviously has to be removed before the flue gas enters the scrubber 10. From the filter, the absorbent is pumped by a pump 22 through a conduit 24 to a point where a slip stream, e.g. 1 lb./130 lbs. of main stream, is withdrawn by a conduit 26 to a $K_2CO_3$ generator 28 while the main stream is conducted by a conduit 30 to a $K_2S_2O_3$ generator 32.

The $K_2CO_3$ generator is a vessel in which the reaction of the spent absorbent, comprising principally $K_2S_2O_3$, with a strong reducing agent, is conducted to convert the thiosulfate to carbonate at 400°–600°F. and 20–100 atmospheres.

The reducing agent used usually consists of a mixture of carbon monoxide, carbon dioxide and hydrogen. The reaction is preferably carried out in the presence of a homogeneous, i.e. soluble, catalyst in which case the essential reducing agent is carbon monoxide. Reduction of the $K_2S_2O_3$ thus proceeds via the reactions (4) $K_2S_2O_3 + 4 CO + 2 H_2O = K_2CO_3 + 2 H_2S + 3 CO_2$
(5) $K_2S_2O_3 + 4 CO + 3 H_2O = 2 KHCO_3 + H_2S + 2 CO_2$
(6) $K_2S_2O_3 + 4 CO + H_2O = 2 KSH + 4 CO_2$ One such homogeneous catalyst is KOOCH. Where KOOCH is used, its concentration generally should exceed about 10 weight percent of the solution.

Alternatively, KOOCH may be used directly as the reducing agent, in which case the principal reactions occurring are the following:

(7) $K_2S_2O_3 + 4 KOOCH + H_2O = 4 KHCO_3 + 2 KSH$
(8) $KHCO_3 + KHS = K_2CO_3 + H_2S$

Reaction (7) is conducted between 450° and 600°F. and preferably between 500° and 550°F. and at pressures between 20 and 80 atmospheres and preferably between 25 and 80 atmospheres.

The KOOCH used in reaction (7) may be regenerated for reuse in a separate operation by the following non-catalytic reactions using CO as the reducing agent.

(9) $K_2CO_3 + 2 CO + H_2O = 2 KOOCH + CO_2$
(10) $KHCO_3 + CO = KOOCH + CO_2$
(11) $KSH + CO + H_2O = KOOCH + H_2S$

Operating conditions required for reactions (9), (10) and (11) are similar to those set forth above for the overall process and for reaction (7) itself. It is thus clear that reactions (7), (8), (9), (10) and (11) can be carried out simultaneously in the same unit operation. The overall result can then be expressed by reactions (4), (5) and (6) and KOOCH behaves thus as a homogenous catalyst.

It is also possible to utilize hydrogen and carbon dioxide as all or part of the reductant, either to regenerate the KOOCH, or to reduce the $K_2S_2O_3$ directly. In this case, however, the introduction of solid contact catalysts is required. Suitable catalysts are transition group metal sulfides such as CuS, NiS, CoS, etc., Subgroup VI sulfides such as $MoS_2$ or $WS_2$, or sulfided nobel metals such as Pt, Pd, Ir, etc. The catalysts may be used as the bulk sulfides, but preferably are supported on activated carbon.

Suitable operating conditions are similar to those set forth above for the non-catalytic operation, i.e. temperatures from 400°–600°F. and pressures from 50–100 atmospheres. Under the recited conditions, some KOOCH will usually be formed and its presence is indeed desirable to prevent decomposition of the thiosulfate to produce undesirable and unreactive sulfate.

The overall process may now be described by reactions such as:

(12) $K_2S_2O_3 + 4 H_2 = 2 KSH + 3 H_2O$
(13) $K_2S_2O_3 + 2 CO_2 + 4 H_2 = 2 KHCO_3 + 2 H_2S + H_2O$ as well as reaction (8), discussed above.

The product from the $K_2CO_3$ + KSH generator 28 will thus consist of a solution of $K_2CO_3$-$KHCO_3$ and KSH in water and may contain, in addition, KOOCH. It is withdrawn through conduit 36. The water content should generally be the minimum required to hold the salts in solution to prevent the steam pressure from building up too high a value in generator 28. Generally, the water content of the product solution will be in the range of 15 to 35 weight percent. The KSH content must be adjusted to meet the requirements set forth previously for the scrubber feed through line 36. If the $K_2S$ content is negligible, as is usually the case, then the mol ratio of KSH to the sum of the mols of $K_2CO_3$ plus one-half the mols of $KHCO_3$ should lie in the range of 0.75 to 0.98. The proper composition is obtained by adjusting the operating conditions in the generator 28, or by adjustment of the gas feed composition. Another method is described below.

The gases $H_2S$ and $CO_2$ produced in the $K_2CO_3$ and KHS generator 28 are withdrawn through an outlet pipe 34. Another method of adjusting the ratio of KSH to $K_2CO_3$ and $KHCO_3$ is by reacting the mixture from generator 28 with some of the $H_2S$ produced thereby, to produce KSH and $KHCO_3$, according to the following equation:

(14) $K_2CO_3 + H_2S = KHCO_3 + KSH$

This reaction is best conducted at 250°–400°F. and 1 to 5 atmospheres.

As stated previously the pH in the scrubber effluent in line 18 must be controlled to be below 7.5 and, preferably, to be within the range of 6 to 7. Once the proper composition of the feed solution through line 36 is established, then pH control is effected by regulating its feedrate. An increase in feedrate will increase the pH and vice versa.

EXAMPLE

Flue gas at 300°F. and containing 2400 ppm $SO_2$ and 3.5 volume percent $O_2$ was passed at a rate of 45,000 SCFH into a Venturi scrubber where it was quenched and saturated with water at 130°F. The saturated gas stream was then passed through a 20-inch diameter tower packed to a depth of 40 inches with 1-inch polypropylene Intalox saddles.

An aqueous liquid absorbent was heated to 145°F. and circulated through the packed tower at a rate of 10 gallons per minute. The pH of the liquid leaving the tower was maintained at 6.7 and the pH of the liquid entering the packed tower was maintained at 7.1.

Control of pH was maintained by pumping both the circulating liquid stream and an aqueous alkaline absorbent having the composition given below at a rate of 66 lbs/hr.

| | |
|---|---|
| KSH | 14.9 wt.% |
| $K_2CO_3$ | 30.0 wt.% |
| $H_2O$ | 55.1 wt.% | into a thiosulfate generator which contained an inventory of liquid of 760 pounds.

The liquid leaving the thiosulfate generator was completely free of KSH as it was quantitatively reacted in the thiosulfate generator.

Net liquid product was withdrawn at a rate of 65.5 lbs/hr. and had the following composition:

| | |
|---|---|
| $K_2S_2O_3$ | 59.0 wt.% |
| $K_2SO_3$ + $KHSO_3$ (Calculated as $KHSO_3$) | 2.0 wt.% |
| $K_2SO_4$ | 0.8 wt.% |

The flue gas left the scrubber at a temperature of 140°F. with an $SO_2$ content of 25 ppm. 99 Percent of the $SO_2$ in the feed gas was removed.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specfically illustrated and described.

We claim:

1. A process for removing $SO_2$ from a gas containing the same which comprises
   a. recirculating an aqueous absorbent through a circuit which includes a gas scrubbing zone and a thiosulfate generation zone outside of said scrubbing zone but still in said circuit;
   b. introducing into said gas scrubbing zone a sulfite-forming additive selected from the class consisting of the hydroxides and carbonates of the alkali metals, the alkaline earth metals, and ammonia in approximately the amount required to convert the $SO_2$ in said $SO_2$-containing gas to sulfite;
   c. maintaining in said recirculating aqueous absorbent a thiosulfate having the same cation as said sulfite-forming additive, the minimum concentration of said thiosulfate being 50 weight percent of the total sulfur-containing solutes in the aqueous absorbent as the latter leaves said scrubbing zone;
   d. maintaining the pH of said recirculating aqueous absorbent in said scrubbing zone between 6 and 8;
   e. passing said $SO_1$-containing gas through said gas scrubbing zone in contact with said recirculating aqueous absorbent, whereby an effluent gas stream containing a reduced amount of $SO_2$ results, and an effluent water stream containing sulfites and thiosulfate is produced;
   f. reacting sulfites formed in step (e) with a sulfite-reducing agent in said thiosulfate generation zone which is maintained at a pH between 6 and 7.8 to convert said sulfites to the corresponding thiosulfate;
   g. withdrawing a portion of said recirculating aqueous absorbent from said circuit;
   h. subjecting said portion to reduction by a thiosulfate-reducing agent to produce fresh aqueous absorbent containing said sulfite-forming additive and said sulfite-reducing agent; and
   i. returning said fresh aqueous absorbent to said thiosulfate generation zone.

2. A process according to claim 1 in which the sulfite-forming additive is selected from the class consisting of the hydroxides and carbonates of the alkali metals and ammonia.

3. A process according to claim 2 in which the concentration ofthe thiosulfate in said recirculating aqueous absorbent is between 25 and 75 percent by weight of said absorbent.

4. A process according to claim 3 in which the concentration of sulfites in said recirculating aqueous absorbent is below 5 weight percent.

5. A process according to claim 4 in which the reaction recited in step (f) of claim 1 is conducted by treating said sulfites with a reducing agent selected from the class consisting of elemental sulfur and MHS where M is the aforesaid cation.

* * * * *